United States Patent [19]

Okamoto

[11] Patent Number: 4,687,218

[45] Date of Patent: Aug. 18, 1987

[54] WHEELCHAIR HANDRIM ASSEMBLY

[75] Inventor: James Okamoto, Clovis, Calif.

[73] Assignee: Motion Designs, Inc., Fresno, Calif.

[21] Appl. No.: 877,494

[22] Filed: Jun. 23, 1986

[51] Int. Cl.[4] .......... B62M 1/14

[52] U.S. Cl. .......... 280/242 WC; 280/289 WC; 297/DIG. 4; 301/6 D

[58] Field of Search .......... 280/242 R, 242 WC, 249, 280/289 WC; 297/DIG. 4; 301/6 D; 74/552, 557, 558; 403/254, 252, 255

[56] References Cited

U.S. PATENT DOCUMENTS 4,366,964 1/1983 Farey et al. .......... 280/242 WC
4,490,064 12/1984 Ducharme .......... 403/254

FOREIGN PATENT DOCUMENTS 7712422 11/1977 Netherlands .......... 403/254

*Primary Examiner*—John J. Love
*Assistant Examiner*—Donn McGiehan
*Attorney, Agent, or Firm*—Manfred M. Warren; Robert B. Chickering; Glen R. Grunewald

[57] ABSTRACT

For a wheelchair, an improved handrim assembly includes a wheelrim with circumferentially spaced-apart slots formed through the wheelrim and anchor tab members loosely mounted through the slots. The anchor tabs have enlarged heads on the outer side of the rim and narrower neck portions which extend radially inward of the wheelrim. Fasteners mounted through apertures in the anchor tab necks extend transversely from the anchor tabs and are rigidly connected to portions to a handrim. Each of the slots in the wheelrim is longer in the circumferential direction than in the transverse direction, and the neck portions of the anchor tabs are flat-sided to bear against the long sides of the slots, thereby reducing shear stresses on the tab neck portions and the wheelrim.

13 Claims, 4 Drawing Figures

WHEELCHAIR HANDRIM ASSEMBLY

FIELD OF THE INVENTION

The present invention generally relates to wheelchair wheel assemblies and, more particularly, to handrim assemblies as are used for manual operation of wheelchairs.

STATE OF THE ART

It is typical for wheelchairs to include circular handrims mounted concentrically about the same axle as the main or rear rubber-tired wheels of the wheelchair such that an occupant of the wheelchair can manually maneuver the wheelchair. Such handrims normally have an overall diameter several inches less than the main rubber-tired wheels, and they are axially spaced outwardly from the rubber-tired wheels to allow the occupant of the wheelchair to easily grip the handwheels. A wheelchair handrim must be sturdy and rigidly attached to the metal wheelrim of the wheel assembly but, at the same time, the handrim should be lightweight and connected to the wheelrim in a manner which does not unduly interfere with manual operation of the wheelchair.

In prior art handrim assemblies, it is known to attach a handrim to the wheelrim by welding rigid mounting flange members to the wheelrim. Such a welded construction, however, has proven to be less than completely satisfactory. One shortcoming of such construction is that the torque forces applied to the handrim and flexure of the wheelrim and the handrim cause stress at the weldments and eventual failure due to cracking. Such mechanical failure of handrim assemblies is not only inconvenient to the occupant of the wheelchair, but is potentially dangerous. Moreover, repair of the failed welded mounting flange cannot be easily accomplished by most wheelchair owners.

It is also known in the prior art to connect a handrim to a wheelrim by mounting members which are riveted to the inner periphery of the wheelrim. However, like welded handrim assemblies, riveted connector members tend to loosen and are prone to mechanical failure after repeated stress and flexure. Still further in the prior art, flange members of various shapes have been secured to wheelrims by screws and other fastening means; however, as in the case of welded and riveted connector members, such fastening assemblies have proven to be less than satisfactory in practice. Such fastening assemblies have been prone to mechanical failure, or to working loose during usage of a wheelchair, or fabrication has proven to be relatively expensive in terms of the assembly time required and the part count.

Upon hindsight, it appears that many of the problems with the prior handrim mounting assemblies have been due to the considerable forces and stresses which are generated while an occupant maneuvers the wheelchair. Particularly, such forces in the direction axial of the wheelrim are sometimes higher than might be expected; this may be because users of a wheelchair tend to push or pull the handrim away and toward the wheelrim while applying a torquing force to the handrim to maneuver the wheelchair.

SUMMARY OF THE INVENTION

A primary object of the present invention is to provide an improved handrim assembly for use with wheelchairs.

More particularly, an object of the present invention is to provide a handrim assembly whereby a handrim is connected to a wheelrim of a wheelchair by a mounting structure which reduces the likelihood of mechanical failure due to stresses in directions axial of the wheelrim.

Another object of the present invention is to provide a handrim mounting assembly for a wheelchair which has fewer parts, is easy to assemble and can be easily repaired in the event cf failure.

In accordance with the preceding objects, the present invention provides an improved handrim assembly for a wheelchair including a rigid circular wheelrim, a plurality of elongated circumferentially spaced-apart slots formed through the circular rim wall of the wheelrim, anchor tab members slidably mounted through each of the slots. Each of the anchor tab members has a head portion with a dimension which exceeds one of the dimensions of the associated slot and a neck portion dimensioned for slidable insertion through the slot to extend radially inward of the inner periphery of the wheelrim. Additionally, spacer means connects the radially inwardly extending neck portions of the anchor tab members to the handrim such that the handrim is rigidly attached co-axially to the wheelrim at a distance spaced axially therefrom. More particularly, in the preferred embodiment of the present invention, each of the slots is elongated in a direction circumferential of the wheelrim and the neck portions of the anchor tab members have a rectangular transverse cross section with flat opposed sides which bear against the long sides of the slot through which the neck portion is inserted. As so constructed and arranged, the handrim assembly of the present invention has substantially superior resistance to mechanical failure due to forces and stresses generated while maneuvering a wheelchair.

Accordingly, an advantage of the present invention is the provision of a handwheel assembly for use with wheelchairs; the assembly provides improved reliability and tolerance to forces generated during usage of the wheelchair and, also provides a simplified design in terms of fabrication and assembly.

The foregoing and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
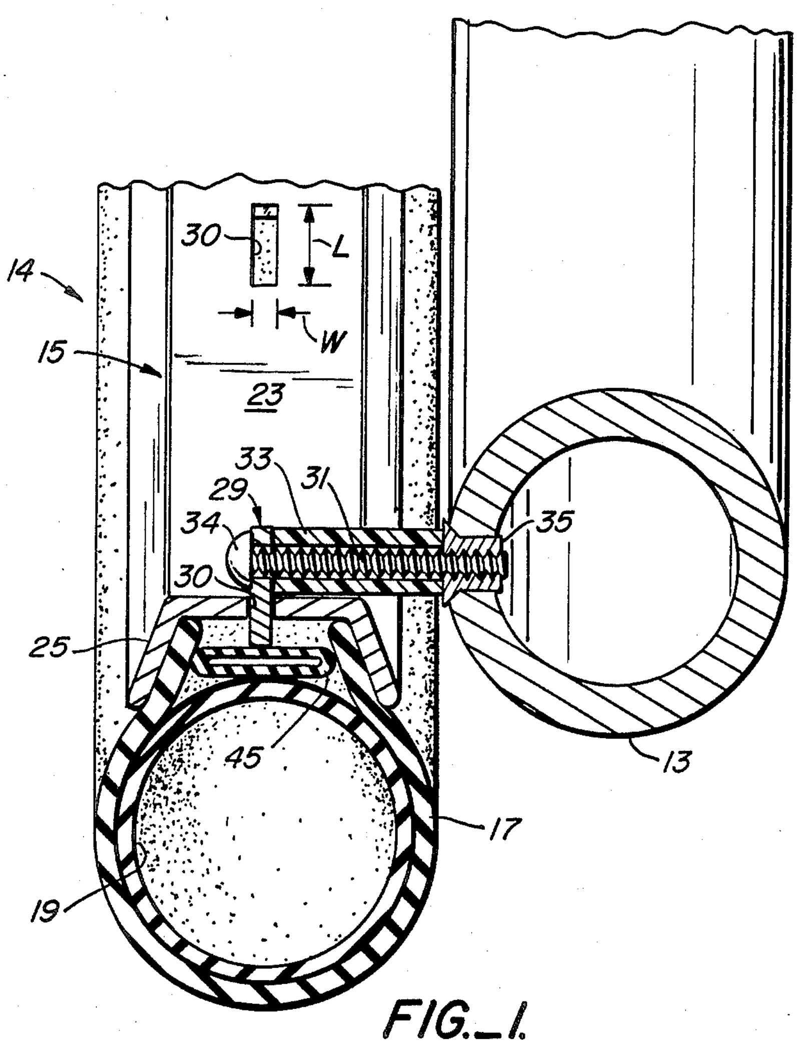
FIG. 1 is a fragmentary front elevation view, partially in radial section, showing a handrim assembly in accordance with the present invention mounted to a wheelchair wheel.

Referring now to FIG. 1 and speaking in general terms, there is shown a drive wheel of a wheelchair in which handrim 13 is rigidly connected in axially spaced-apart relationship to wheel assembly 14. In this embodiment, wheel assembly 14 includes a wheelrim 15 which carries a conventional tire 17 and an inflatable inner tube 19. In radial cross-section, wheelrim 15 has a generally U-shaped configuration defined by a circular rimwall 23 and opposed sidewalls 25 and 26, respectively, which extend divergingly away from one another generally radially outwardly from a central hub or axle (not shown). Wheelrim 15 is supported from the central axle by conventional means such as spokes or the like. It can be appreciated that wheelrim 15 can carry either inflatable tire 17 or, alternatively, a solid rubber tire.

In order to rigidly secure handrim 13 to wheelrim 15, the handrim is mounted to wheelrim 15 by means of a plurality of anchor tab members 29 which extend radially through circumferentially extending slots 30 formed at circumferentially spaced-apart intervals through rimwall 23. The handrim mounting assembly further includes shafts 31, which extend in the axial or lateral direction between the radially inwardly extending ends of anchor tab members 29 and handrim 13, and spacer sleeves 33, which are fitted about shafts 31 to rigidly space handrim 13 a constant axial or lateral distance from wheelrim 15. Preferably, each shaft 31 is a bolt having a head 34 at one end and an opposite threaded end. In practice, so-called "RIV NUTS" 35 are fixed to handrim 13 and formed to receive the threaded ends of bolts 31. In practice, spacer sleeves 33 comprise hollow tubular members fabricated, for example, from a metal or plastic. Additionally, sleeve 33 preferably has a radius substantially equal to the radial distance at which bolt 31 is secured to tab 29 so that rim wall 23 will engage sleeve 33 and provide support for radial loading forces.

It should be appreciated that FIG. 1 is a fragmentary view and that only one of the mounting assemblies between handrim 13 and wheelrim 15 is shown. In a complete wheel assembly, there is a series of the above-described anchor tabs and connecting bolts which are spaced equally apart from one another circumferentially about wheelrim 15. Typically, about six of such mounting assemblies would be provided, spaced about sixty degrees apart from one another.

Figure 2:
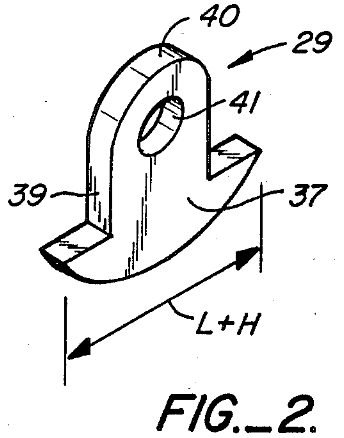
FIG. 2 is a to perspective view of the anchor tab employed in the handrim assembly of FIG. 1.

A single anchor tab member 29 is shown in detail in FIG. 2. In this embodiment, anchor tab member 29 has, in profile, an enlarged head portion 37 and a relatively narrow neck portion 39. In practice, anchor tab members 29 are relatively thin, flat pieces which can be formed, for example, by stamping steel sheet. Further, each anchor tab member 29 includes an aperture 41 formed transversely through neck 39 at a position proximate distal end 40 of neck 39. The purpose of aperture 41 is to receive shaft 31, as shown in FIG. 1, for rigid connection to handrim 13.

The cooperative relationship between an anchor tab member 29 and wheelrim 15 can be readily appreciated with reference to FIG. 1. It should be noted that each slot 30 is formed through rimwall 23 medial the opposed sidewalls 25 and 26, and each slot 30 is relatively longer in the circumferential direction than in the direction transverse to the wheelrim. In FIG. 1, the length of an unoccupied slot 30 is indicated as "L", and the width is indicated by "W." As is shown in FIG. 2, the width and length of neck 39 of anchor tab member 29 is slightly less than "W" and "L", respectively. The circumferential length of head portion 37 substantially exceeds the length of neck portion 39 and of slot 30, as indicated by dimension "L+H." As so dimensioned, neck portion 39 slidably fits through slot 30, but head portion 37 extends beyond the opposite ends of slot 30 to prevent entire anchor tab member 29 from passing through the slot. In practice, dimension L is about 0.4 inches, dimension L+H is about 0.8 inches, neck portion 39 extends radially inwardly from head 37 by about 0.5 inches. Anchor tab member 29 is preferably formed from No. 14 gauge steel sheet.

With the interconnecting mounting assemblies constructed and arranged as shown in FIG. 1, the long sides of elongated slots 30 provide surfaces which receive the bearing force of the opposed long or circumferentially extending side's of neck portions 39 of anchor tab members 29. Accordingly, forces in an axial direction or transverse to wheelrim 15 between handrim 13 and wheelrim 15 are distributed over relatively broad bearing areas and, therefore, shear stresses on anchor tab members 29 and rim wall 23 are, in effect, reduced. Consequently, in comparison to prior art connectors for fastening handrims to wheelrims, the above-described assembly provides improved tolerance to stresses generated during operation of a wheelchair and, therefore, increased reliability.

In a final assemblage with an inner tube 19, it is preferable to provide an annular rim strap member 45. Such rim straps are conventional, commercially available items. In the assemblage, rim strap 45 assists in holding anchor tab members 29 in place against rimwalls 23 until such time as anchor tab members 29 are connected to the handrim by threaded shafts 31 and spacer sleeves 33, which trap the anchor tabs against removal from slots 30.

Figure 3:
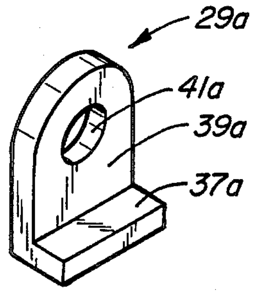
FIG. 3 is a top perspective view of an alternative embodiment of the anchor tab shown in FIG. 2.

In FIG. 3, an anchor tab member 29*a* is shown as an alternative embodiment of anchor tab members 29 previously illustrated and described. In this embodiment, anchor tab member 29*a* includes a neck portion 39*a* having an aperture 41*a* formed therein essentially identical to the previously described embodiment. However, in the embodiment of FIG. 3, head portion 37*a* of anchor tab member 29*a* is formed to extend approximately perpendicularly to the flat circumferentailly extending side of neck portion 39*a*. Thus, in assembled condition in a wheelrim 15, head portion 37*a* of anchor tab member 29*a* will extend in the axial direction relative to the handrim-wheelrim assembly; i.e., in this embodiment head portion 37*a* will extend beyond the sides, rather than the ends, of slots 30. As in the prior embodiment, anchor tab member 39*a* serves to distribute stresses across the long sides of a slot 30 when installed in a rimwall.

Figure 4:
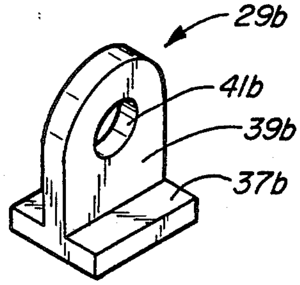
FIG. 4 is a top perspective view of still another alternative embodiment of the anchor tab of FIG. 2.

In FIG. 4, still another embodiment of an anchor tab member is illustrated. In this embodiment, anchor tab member. 29*b* has a neck portion 39*a* and an aperture 41*b* formed therein substantially identical to the corresponding aspects of the previously described embodiments. However, in the embodiment of FIG. 4, head portion 37*b* of anchor tab member 29*b* extends perpendicular to both flat sides of neck portion 39*b*. Thus, anchor tab member 29*b* has a generally inverted T-shaped configuration when viewed from the end or in transverse-cross section. Accordingly, in assembled condition with a wheelrim 15, head portion **37*b* of anchor tab member 29*b* extends beyond both sides of a slot 30 to retain the anchor tab member within the wheelrim 15. As in the prior embodiments, anchor tab member 29*b* has a relatively large lateral bearing area to distribute stresses across the long sides of slots 30** when installed in a rim wall and, therefore, provides substantially increased durability under conditions of sideways impact and stress.

Although the present invention has been described with particular reference to the illustrated embodiments, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all such alterations, modifications and embodiments as fall within the spirit and scope of the present invention.

What is claimed is:

1. An improved handrim assembly for a wheelchair comprising:

(a) a rigid circular handrim;

(b) a wheel assembly including a rigid circular wheelrim having a circular rim wall and a plurality of circumferentially spaced-apart slots formed through said rim wall, said slots being elongated in the circumferential direction;

(c) a plurality of anchor tab members fitted loosely through each of said slots, each of the anchor tab members having a head portion having a dimension exceeding one of the dimensions of an associated slot and neck portion dimensioned for loose insertion from an outer side of said rim wall through the slot to extend radially inward beyond the inner periphery of the wheelrim, said neck portion having a flat side mounted to bear against the elongated side of said slot;

(d) a plurality of spacer means extending laterally of said rim wall and connecting each of the inwardly extending neck portions of the anchor tab members to the handrim to rigidly attach said hand rim to the wheelrim at a distance spaced laterally therefrom.

2. An improved handrim assembly as defined in claim 1, and a circular rim strap fitted about the outer side of said rim wall to provide cushioning between the head portions of said anchor tab members and an inner tube mounted to the wheelrim.

3. An improved handrim assembly as defined in claim 1 wherein, said neck portion of said anchor tab members each have an aperture formed therethrough proximate the innermost end thereof, and said spacer means includes a shaft-like member fitted through said apertures to rigidly connect the handrim to the wheelrim.

4. An improved handrim assembly as defined in claim 3 wherein, said spacer means includes a sleeve member mounted on said shaft-like member to form a rigid spacer between said neck portion of said anchor tab members and said handrim.

5. An improved handrim assembly as defined in claim 4 wherein, said shaft-like member is threaded at one end, and said spacer means includes means connected to the handrim to threadably receive said threaded end of said shaftlike member.

6. An improved handrim assembly as defined in claim 1 wherein, each of said slots is longer in a direction circumferential of said rim wall than wide in a direction transverse to the rim wall.

7. An improved handrim assembly as defined in claim 6 wherein, each of said slots is aligned medial of said rim wall of the wheelrim.

8. An improved handrim assembly as defined in claim 6 wherein, each of said head portions has retaining portions which extend beyond the opposite ends of said slots to abut the outer side said rim wall proximate said ends such that the anchor tab members are retained within the wheelrim.

9. An improved handrim assembly as defined in claim 6 wherein, each of said head portions has a retaining portion which extends beyond a side of said slots to abut the outer side of the rim wall proximate said side of said slots such that the anchor tab members are retained within the wheelrims.

10. An improved handrim assembly as defined in claim 9 wherein, said retaining portions extend beyond both sides of said slots to retain the anchor tab members within the wheelrim.

11. A wheelchair wheel assembly including a circular wheelrim, and a circular handrim mounted coaxially with and in laterally spaced relation to said wheelrim, wherein the improvement in said wheel assembly comprises:

a plurality of slots extending through said wheelrim and circumferentially spaced apart around said wheelrim;

a plurality of anchor tabs mounted in said slots, said tabs each having an enlarged head positioned on an outer side of said wheelrim, and a relatively smaller neck dimensioned for and mounted in sliding engagement through each of said slots, said neck terminating in a distal end radially inwardly spaced from said wheelrim; and a plurality of connector means coupled to said tabs proximate said distal end and extending transversely of said wheelrim to trap said tabs against removal from said slots, and said handrim being coupled to said connector means in transversely spaced relation to said tabs

12. The wheelchair assembly as defined in claim 11 wherein, said slots are circumferentially enlongated, said neck has a transverse cross section substantially mating with said slots and said neck is formed with an aperture extending laterally therethrough proximate said distal end, and said connector means is provided by a cylindrical fastener assembly having a radius substantially equal to the radial distance inwardly from said wheelrim to the center of said aperture.

13. The wheelchair wheel assembly as defined in claim 12 wherein, said slots and the cross section of the necks of said tabs are rectangular, and said fastener assembly includes a fastener head mounted on a side of said neck opposite said handrim and a threaded end threadably coupled to said handrim.

* * * * *